(12) United States Patent
Lin

(10) Patent No.: US 6,394,862 B1
(45) Date of Patent: May 28, 2002

(54) STRUCTURE OF ELECTRIC BUOY

(76) Inventor: Chien-Chung Lin, P. O. Box No. 6-57, Chung-Ho City, Taipei Hsien 235 (TW)

( * ) Notice: Subject to any disclaimer, the term of this patent is extended or adjusted under 35 U.S.C. 154(b) by 0 days.

(21) Appl. No.: 09/667,253

(22) Filed: Sep. 22, 2000

(51) Int. Cl.[7] .............................................. B63B 22/00
(52) U.S. Cl. ........................................................ 441/16
(58) Field of Search ............................ 441/1, 6, 13, 16, 441/21, 28; 43/17, 17.5

(56) References Cited

U.S. PATENT DOCUMENTS 5,073,136 A * 12/1991 DeWitt et al. ................. 441/7
5,176,552 A * 1/1993 Kuboyama et al. ........... 441/16
5,295,882 A * 3/1994 McDermott ................... 441/16

* cited by examiner

*Primary Examiner*—Jesus D. Sotelo
(74) *Attorney, Agent, or Firm*—Troxell Law Office PLLC

(57) ABSTRACT

A structure improvement of electric buoy is a buoy composed of a lower body and an upper body. The primary design improvement is an adjustable button equipped in the lower body of the buoy, near the hook surroundings and several magnetic rings. Some screw threads are formed at the outer rim of the button. The screw threads and the square-shape lower body of a buoy match perfectly and function as micro adjustment. When buoyancy or lead weight varies and buoy sensitivity is poor, one may properly adjust the button to obtain optimal sensitivity.

1 Claim, 5 Drawing Sheets

STRUCTURE OF ELECTRIC BUOY

BACKGROUND OF THE INVENTION

1) Field of the Invention

The invention is related to an improvement of electric buoy. It particularly implies the micro adjustment button beneath the hook surroundings and several magnetic rings embedded in the lower body of a buoy. When the buoyancy of a buoy varies due to lead weight and the buoy sensitivity decreases, the button can be properly adjusted after optimal sensitivity is achieved.

2) Description of the Related Art

Living in the highly developed business society, people possess high quality of life. They pursue better leisure activities after work. Naturally, fishing becomes one of the favorite leisure activities. Buoys are absolutely required for fishing.

Because the buoyancy of a buoy is different due to the various densities of seawater and fresh water, buoy sensitivity varies. Seawater and fresh water also vary due to environmental changes. Thus, buoyancy is various, and buoy sensitivity varies respectively. That is, a fisher has to purchase various buoys for particular needs as fishing in the areas of seawater or fresh water. Fishing expenses are therefore increased. Besides, the lead size for a buoy can affect buoy sensitivity. To eliminate the above imperfection, the invention is eventually motivated.

Electric buoys of prior art do not provide any improvement and creation regarding the above deficiency, except the function of night flash and power saving. Based on the spirit of research and invention refinement, the inventor employs professional techniques and knowledge to develop one kind of electric buoy. It is more practical, widely applicable, and complied with product economic principle, according to the above imperfection.

SUMMARY OF THE INVENTION

The structure improvement of electric buoy is a buoy composed of a lower body and an upper body. The primary design improvement is an adjustable button equipped in the lower body of the buoy, near the hook surrounding and several magnetic rings. Some screw threads are formed at the outer rim of the button. The screw threads and the square-shape lower body of the buoy match perfectly and function as micro adjustment. When buoyancy or lead weight varies and buoy sensitivity is poor, one may properly adjust the button to obtain optimal sensitivity.

The main objective of the invention is to adjust a buoy by utilizing the adjustment mechanism of the button, according to various buoyancy and lead weight. Through proper adjustment, optimal buoy sensitivity is achieved. The secondary objective of the invention is to reduce fishers' expenses and cost and to comply with economic principle through the use of adjustment buttons. For committee's better understanding to the function, structure, and properties of the invention, a practical example is presented, together with brief description of drawings as follows:

DETAILED DESCRIPTION OF THE INVENTION

Figure 1:
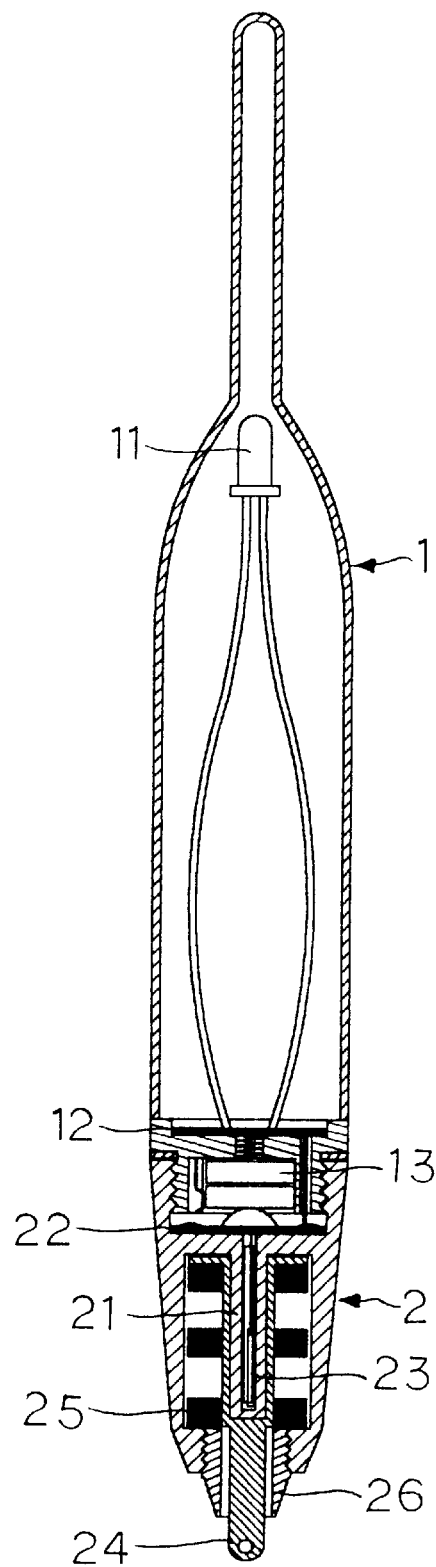
FIG. 1 is a cross-sectional view of the invention herein.
Figure 2:
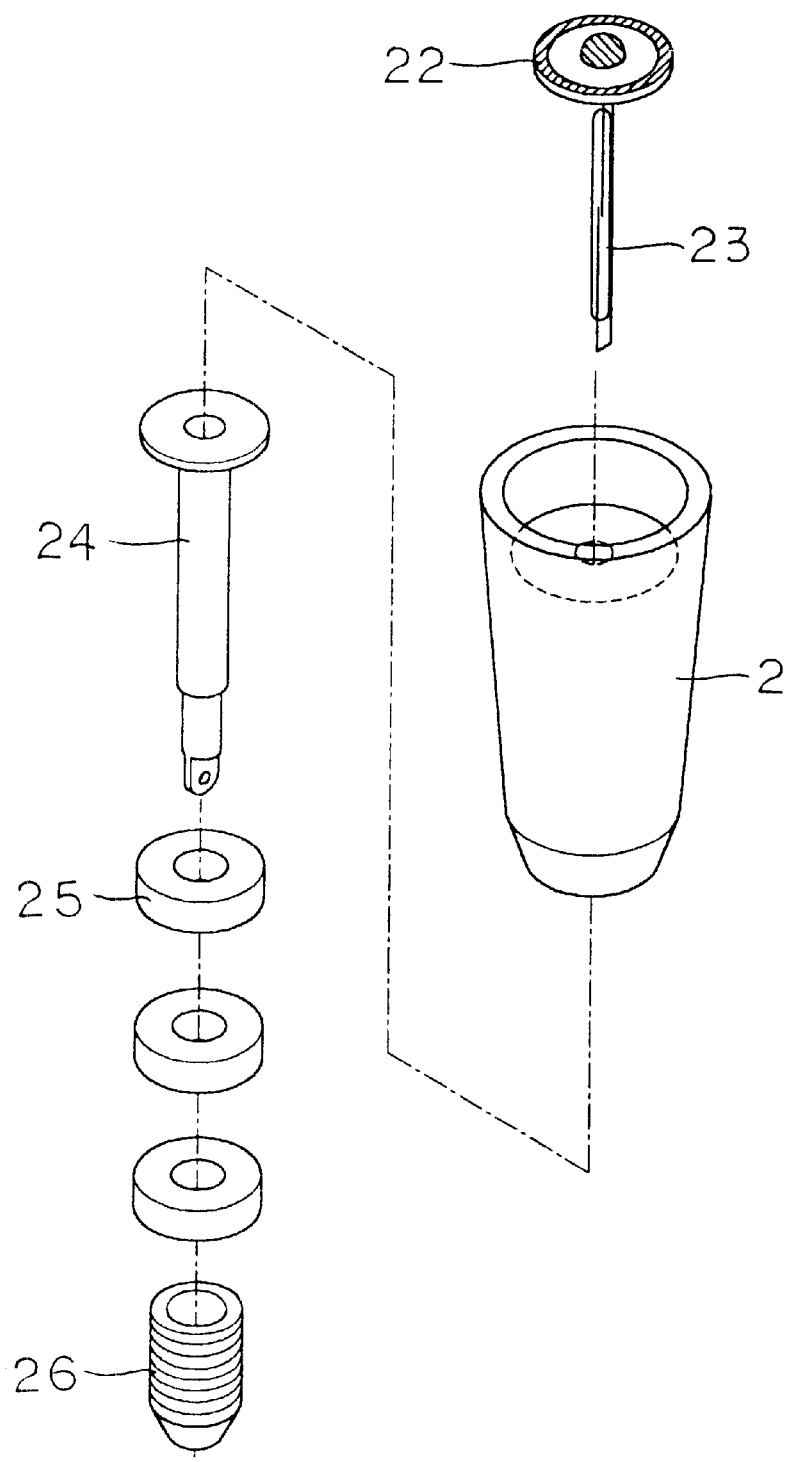
FIG. 2 is an exploded perspective view of the invention herein.
Figure 3:
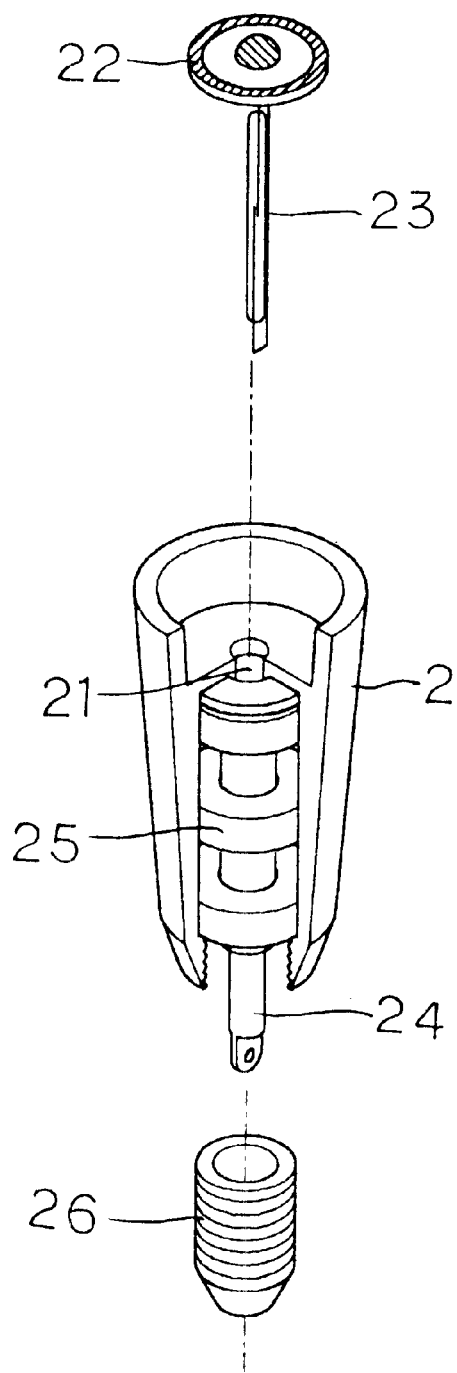
FIG. 3 is a partial, exploded view of the invention herein.

First, please refer to FIG. 1 and 2, the elevation and exploded drawing of the invention herein, and follow illustration in FIG. 3. The invention is a buoy composed of a lower body 2 and an upper body 1. Inside the buoy, there is a lighting device 11 controlled by an IC panel 12 and a power supply battery 13. The lower body of the buoy contains a tube 21, an electric conduction panel 22 at the top end, which forms an electric loop with the battery contact point. The internal flexible magnetic spring 23 joins panel 22 and hook 24 surrounded by a triple magnetic ring 25, which will be rejected for same polar property. The micro adjustment button 26 is set under the rim of hook 24 and triple magnetic ring 25. A number of screw threads are formed at the outer rim of the button 26. The screw threads and lower body of the buoy match perfectly and function as micro adjustment. When buoyancy or lead weight varies and buoy sensitivity is poor, one may appropriately adjust the button to obtain optimal sensitivity.

Figure 4:
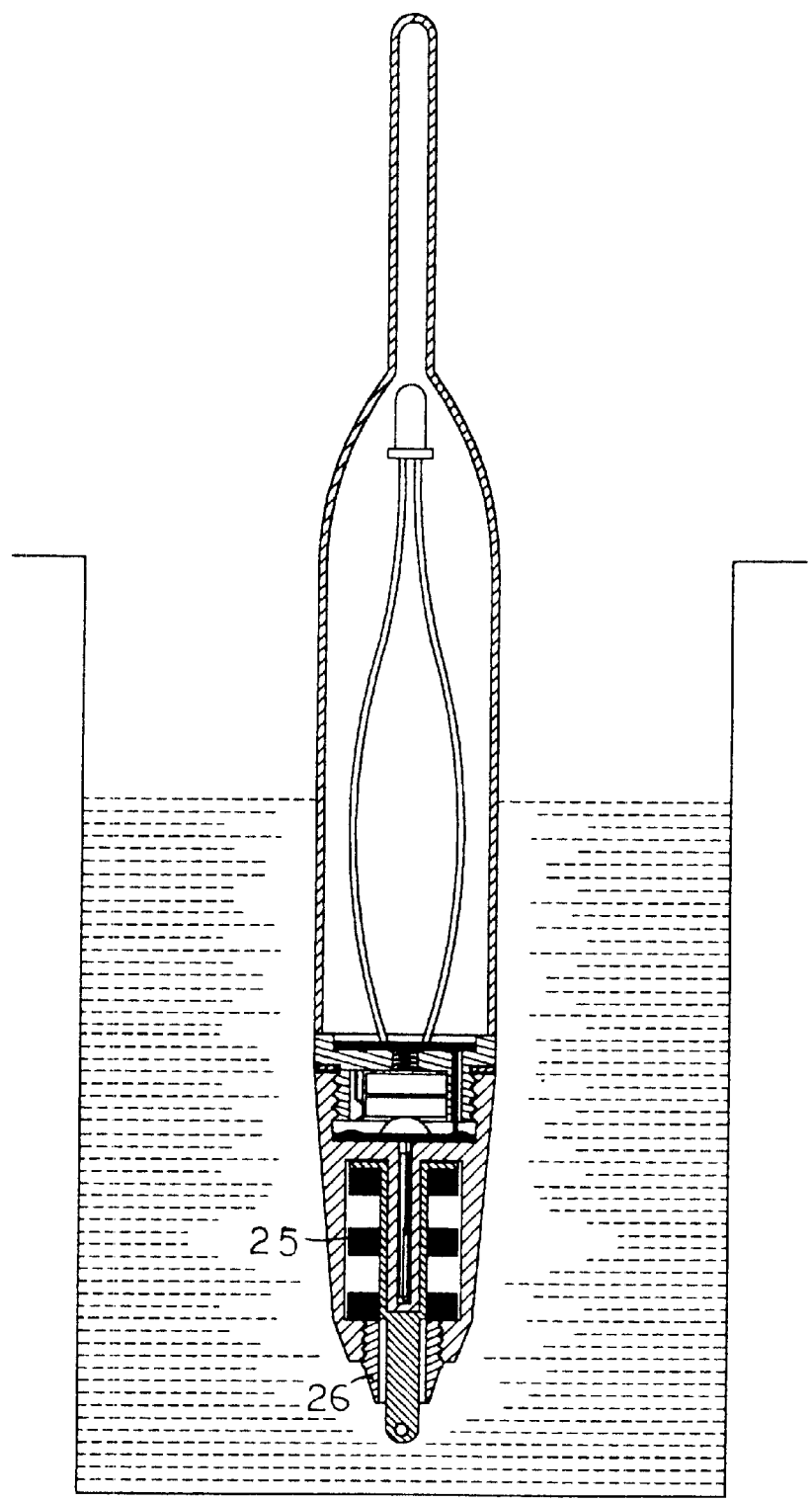
FIG. 4 is a cross-sectional side view of the invention herein that is depicted in a first state.
Figure 5:
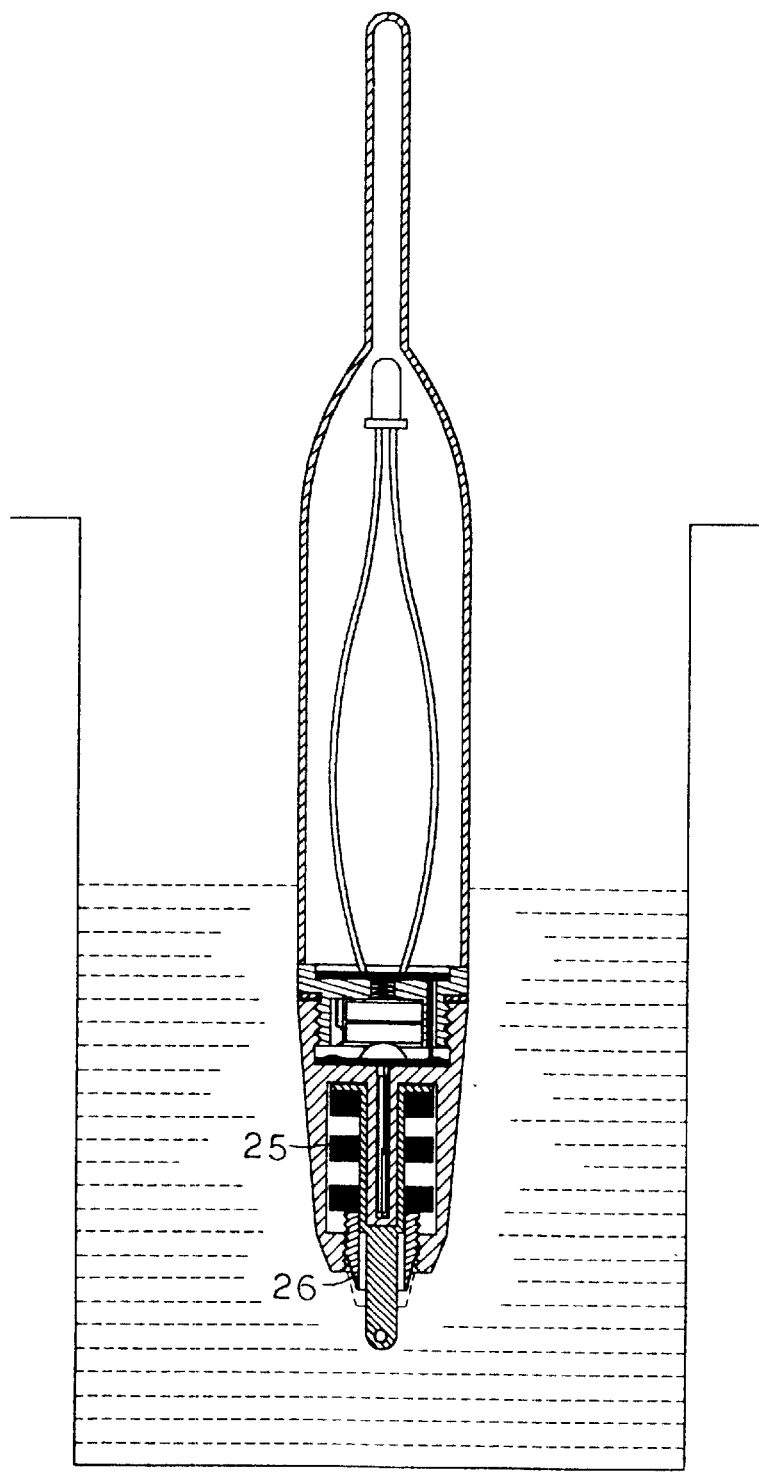
FIG. 5 is a cross-sectional side view of the invention herein that is depicted in a second state.

The operation procedure is demonstrated in FIGS. 4 and 5. Generally, buoyancy for seawater is greater than that in fresh Water. When fishing in seawater using the invention, one must twist the micro adjustment button 26 clockwise if the buoy is over-lifting. Then, button 26 is lowered near the opening of the lower body of the buoy and the triple magnetic ring 25 is forced downward. The centroid of the buoy is therefore moved down to achieve optimal buoy sensitivity. On the contrary, when fishing in fresh water, one must twist the micro adjustment button 26 counter-clockwise if the buoy is moving down. Then, button 26 moves upward near triple magnetic ring 25 and the ring lifts. The centroid of the buoy is therefore moved upward to achieve optimal buoy sensitivity.

Also, the lead of a buoy can affect buoy sensitivity. Twist the micro adjustment button 26 counter-clockwise for heavy lead and the buoy moves downward. For light lead, twist the button 26 clockwise if the buoy is over-lifting. Through appropriate operation of the micro adjustment button according to the buoyancy in water and lead size, optimal buoy sensitivity can be achieved. Fishers can save expenses. It also complies with economic principle.

In summation of the foregoing sections, the newly developed structure of an electronic buoy is obviously more practical than the prior art of buoys. Also, the structure and functional characteristics are innovated and very creative. The invention meets all the requirements and is lawfully submitted for review and the granting of the commensurate patent rights to thereby encourage the spirit of invention and its rightful protection under the patent law. The above description and illustration is merely one of the operation example for the invention. The application extent for the invention should not be confined. All the various changes of related structure characteristics and functions depicted above and others based on the patent application spirit should be considered as violation to the invention patent.

What is claimed is:

1. An electric fishing buoy comprising:

a) an upper body with a lighting device therein;

b) an integrated circuit (IC) panel in the buoy and connected to the lighting device;

c) batteries connected to the IC panel to supply electrical power to the IC panel and to the lighting device;

d) a lower body attached to the upper body having a hollow, internal tubular portion;

e) at least three annular magnets in the lower body displaced along the tubular portion, the annular magnets oriented such that like magnetic poles face each other whereby a repulsive magnetic force between the annular magnets spaces the magnets apart along the tubular portion of the lower body; and, f) a threaded button threadingly engaging the lower body and in contact with one of the at least three annular magnets such that rotation of the button relative to the lower body changes the spacing between the at least three annular magnets, thereby changing a location of a centroid of the buoy.

* * * * *